Dec. 3, 1940.   F. H. VAN NEST   2,223,976
PRESSURE RESPONSIVE DEVICE
Filed Dec. 3, 1938
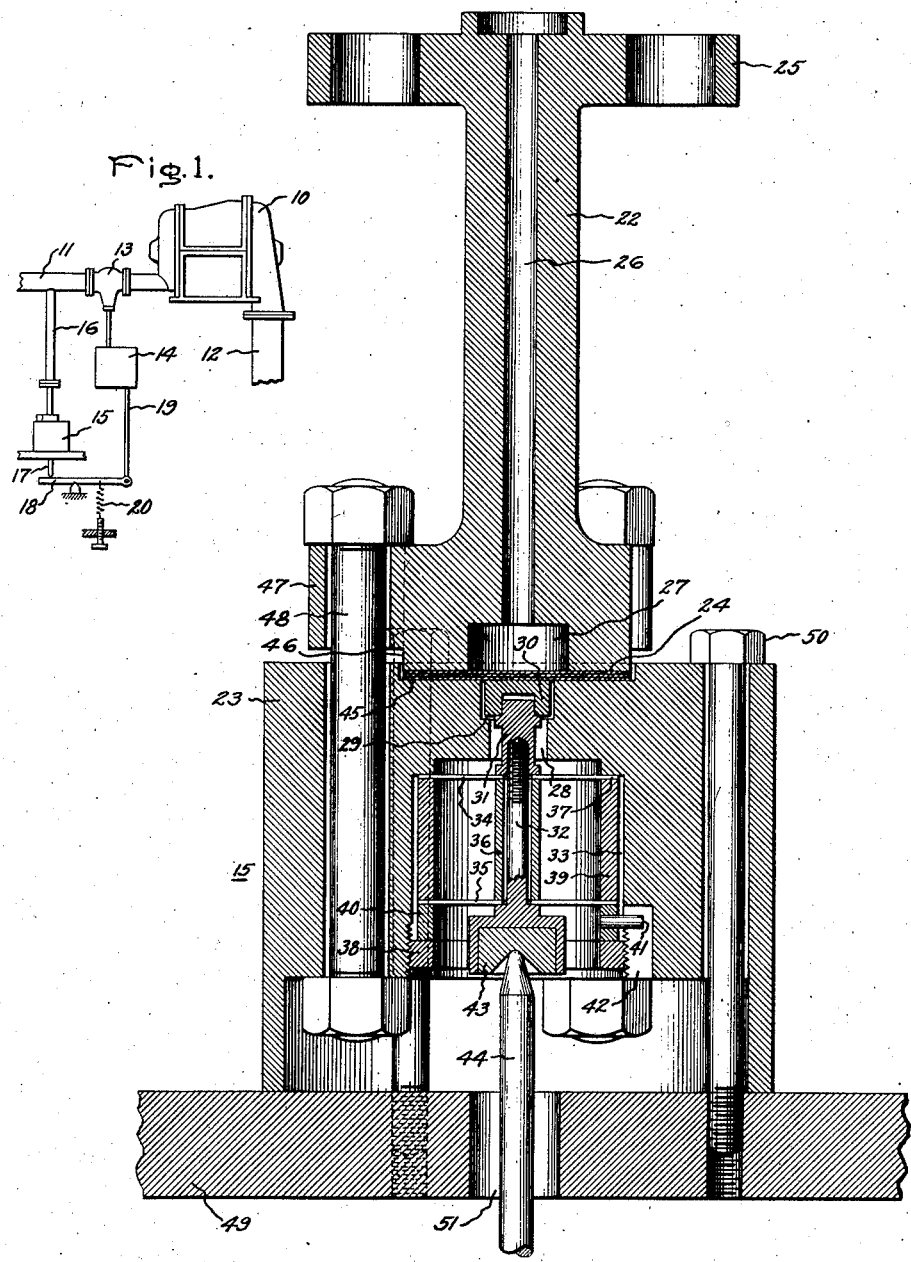
Inventor:
Francis H. Van Nest,
by Harry E. Dunham
His Attorney.

Patented Dec. 3, 1940

2,223,976

UNITED STATES PATENT OFFICE 2,223,976

PRESSURE RESPONSIVE DEVICE

Francis H. Van Nest, Saugus, Mass., assignor to General Electric Company, a corporation of New York Application December 3, 1938, Serial No. 243,784

4 Claims. (Cl. 137—156)

This invention relates to pressure responsive devices and more particularly to such devices adaptable for use with relatively high pressures.

Pressure responsive devices are usually provided with a diaphragm, one side of which is subjected to the pressure fluid while the movement of the diaphragm is transmitted through various means as a function of the pressure. Such devices which are to be used with extremely high pressures as, for example, with pressures of the order of 1200 pounds per square inch and over, require a diaphragm of relatively great strength as well as a relatively rugged diaphragm mounting arrangement.

It is an object of this invention to provide a new and improved pressure responsive device which is extremely simple in design, of relatively great strength and suitable for use with relatively high fluid pressures.

For a consideration of what I believe to be novel and my invention, attention is directed to the following description and the claims appended thereto taken in connection with the accompanying drawing.

In the drawing, Fig. 1 is a schematic diagram illustrating one embodiment of the invention, while Fig. 2 is a cross-sectional view through the pressure responsive device constructed in accordance with my invention.

Referring to Fig. 1, 10 is a turbine receiving high pressure elastic fluid through the conduit 11 and exhausting through the conduit 12 to other elastic fluid consuming apparatus or a condenser. A suitable admission valve 13 is arranged in the conduit 11 for regulating the flow of elastic fluid to the turbine. The admission valve may be actuated by any suitable device 14 in accordance with the pressure of the elastic fluid supply. A pressure responsive device 15, in communication by connection 16 with the supply conduit 11 ahead of the valve 13, imparts regulating impulses through the stem 17, pivoted lever 18 and link 19 to the valve actuating device 14. By means of a suitably arranged spring 20, the operation of the apparatus may be adjusted as desired. Since the device 15 is subjected to the pressure of the elastic fluid supply, which may be of the order of 1200 pounds per square inch or greater, its parts must be of a very substantial design, yet for accurately controlling the regulation of the turbine admission valves, it must be sensitive to slight variations in pressure.

The device 15, according to my invention, comprises a head or conduit section 22 and a casing 23 having a flexible inperforate diaphragm 24 clamped tightly therebetween. The head, which is adapted to be connected to a source of pressure fluid by means of the coupling flange 25, is provided with an axial bore 26. The lower end of the bore is somewhat enlarged as at 27 so that a suitable area of the diaphragm 24 is exposed to the pressure fluid. The casing 23 is provided with an axially extending bore 28, the upper end of the bore being slightly enlarged forming a shoulder 29 therein. A disk 30 having a diameter slightly less than that of the enlarged section of the bore is arranged therein above the shoulder 29. The lower side of the disk 30 is recessed for receiving the upper end of the supporting stem portion 31. The supporting stem which is axially arranged within the bore and maintains the disk in spaced relationship with respect to the side walls of the bore comprises in addition to the portion 20 31 a cooperating bolt 32 which is threaded into the lower end of the portion 31. The stem is fastened within a lower enlarged section 33 of the bore by means of the resilient metal strips 34 and 35 which are securely clamped at their mid-section between the opposite ends of the spacing sleeve 36 and suitable shoulders of the stem portions 31 and 32, respectively. The outer ends of the resilient strips may be fastened to the casing in any suitable manner. As indicated, the enlarged section of the bore is provided with a shoulder 37 near its upper end and is threaded at its lower end for cooperatively receiving the threaded ring nut 38. The outer ends of the resilient strips 34 and 35 are securely fastened between the shoulder 37 and the nut 38 with an intermediate spacer 39. A washer 40, having a pin 41 projecting into the slot 42, is provided to preclude the turning of the parts as the nut 38 is screwed into place. The lower end, or head, of the bolt 32 is provided with a seat portion 43 of suitably hardened material which is recessed to receive the end of a stem 44 corresponding to the stem 17 in Fig. 1 for transmitting impulses from the device to other associated apparatus, such as the lever 18 of Fig. 1.

The diaphragm 24 is arranged within the recessed portion 45 on the upper surface of the casing which facilitates the positioning of the diaphragm with respect to the aligned bores 27 and 28. The diameter of the diaphragm is substantially greater than that of either of the bores 27 and 28, the peripheral portion of the diaphragm being adapted to be clamped securely between the downwardly extending rim 46 of the head flange 47 and the recess 45 in the housing by means of bolts 48. It will be noted that the bore 27 is at least as large as, and preferably somewhat larger than, the upper end of the bore 28.

The pressure responsive device may be fastened upon a stationary support 49 by means of bolts 50 extending through holes provided in the periphery of the casing. An opening 51 through the support allows access of the stem 44 to the moveable element of the device.

In the normal unloaded condition, the disk 30 is preferably supported in the upper end of the casting bore so that the upper surface thereof is substantially in the plane of the recessed portion 45 or projecting slightly thereabove. Upon pressure being admitted to the device through the passage 26, the diaphragm will be forced downwardly moving the disk axially within the bore. Movements of the disk will in turn be transmitted by means of its supporting stem to the impulse transmitting member 44. This device is extremely sensitive to variations in pressures imposed upon the diaphragm by virtue of the fact that the movable element is suspended frictionless within the device. The resilient strips 34 and 35 are relatively light and serve primarily for maintaining the stem and disk in a predetermined alignment within the bore. Since this pressure responsive device is designed for use with relays of modern design, it is not necessary that provision be made for any great length of travel for the movable element. Depending upon the characteristics of the associated apparatus, the amount of travel of the stem may be limited to a maximum, for example, of the order of ten to fifteen thousandths of an inch. Movement of the element beyond such a limit and consequent damage to the device and associated apparatus is precluded by the engagement of the lower edges of the disk 30 with the shoulder 29.

The diaphragm itself may be of any suitable material, for example, relatively durable rubberized fabric. The under surface of the diaphragm is supported substantially throughout its entire exposed area extending across the end of the bore 28 by the upper surface of the disk 30 and since the travel of the disk is positively limited, the danger of rupturing the diaphragm is slight. The diaphragm, however, is readily accessible for replacement or repair by simply removing the head 22 and may be replaced without effecting the adjustment of any of the associated apparatus.

Having described the principle of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A pressure responsive device comprising a casing, a diaphragm in said casing, a passage through said casing for introducing pressure fluid to said diaphragm, a bore through said casing allowing access to a portion of the surface of said diaphragm opposite said passage, stem means arranged in said bore and loosely engaging with said diaphragm for transmitting fluid pressure impulses therefrom, resilient metal strips arranged substantially perpendicularly with respect to said stem means and secured at their outer ends to said casing and at the inner portions thereof to said stem means, said strips maintaining said stem means in a centered spaced relationship with respect to the side walls of said bore while permitting limited longitudinal and frictionless movement of said stem within said bore.

2. A pressure responsive device comprising a casing, a bore through said casing, stem means arranged in said bore, the diameter of the upper end of said stem means being slightly smaller than the diameter of the upper end of said bore, a resilient diaphragm secured in said casing across the end of said bore and being engaged across substantially one entire surface thereof by said casing and said stem means, a passage through said casing for introducing pressure fluid to a portion of the surface of said diaphragm opposite said one surface and said stem means, and resilient means securing said stem means in said casing in a spaced relationship with respect to the side walls of said bore.

3. A pressure responsive device comprising a casing having an upper and a lower half with axial aligned bores, a diaphragm between the halves, a plurality of bolts clamping the halves together, the bore of the upper half adjacent a diaphragm being enlarged to form a pressure chamber, the bore in the lower half being enlarged to form a cylindrical chamber axially spaced from the diaphragm, and means for transmitting movement of the diaphragm due to pressure changes in the pressure chamber comprising a disk engaging the lower surface of the diaphragm and forming a small clearance with the bore in the lower casing half, a stem engaging the disk and projecting into the cylindrical chamber and a plurality of circumferentially spaced flexible strips with inner ends secured to the stem and outer ends secured to the wall of the cylindrical chamber to center and guide the stem with a minimum of resistance.

4. A pressure responsive device comprising a casing having two halves with a diaphragm clamped between them, one half forming a pressure chamber adjacent the diaphragm, the other half having a cylindrical bore coaxial with the diaphragm, and means for transmitting movement of the diaphragm including a stem with a disk engaging the diaphragm and located in the cylindrical bore and a plurality of circumferentially and axially spaced flexible strips having inner ends secured to the stem and outer ends secured to the cylindrical bore to center and guide the stem with a minimum of resistance against axial movement.

FRANCIS H. VAN NEST.